US005896881A

United States Patent [19]
Herzog et al.

[11] Patent Number: 5,896,881
[45] Date of Patent: Apr. 27, 1999

[54] PROCESS AND DEVICE TO REGULATE THE INNER PRESSURE OF A TANK AND/OR TO ESTABLISH DEFINED FLOW CONDITIONS FOR GAS CURRENTS IN THE HEAD SPACE OF TANKS

[75] Inventors: Friedhelm Herzog, Krefeld; Franz Lürken, Kempen, both of Germany

[73] Assignee: Messer Griesheim GmbH, Germany

[21] Appl. No.: 08/660,931

[22] Filed: Jun. 10, 1996

[30] Foreign Application Priority Data

Jun. 10, 1995 [DE] Germany ............ 195 21 297

[51] Int. Cl.⁶ ............................................. G05D 11/03
[52] U.S. Cl. .................. 137/8; 137/99; 137/209; 137/565; 141/59
[58] Field of Search ................... 137/565, 99, 8, 137/206, 209; 141/59

[56] References Cited

U.S. PATENT DOCUMENTS

| 3,016,928 | 1/1962 | Brandt | 141/59 X |
|---|---|---|---|
| 3,850,208 | 11/1974 | Hamilton | 141/59 |
| 3,858,404 | 1/1975 | Davis . | |
| 4,068,687 | 1/1978 | Long | 141/59 |
| 4,082,122 | 4/1978 | McGahey | 141/59 X |
| 4,202,385 | 5/1980 | Voelz et al. | 141/59 |
| 4,291,720 | 9/1981 | Folland | 137/209 |
| 4,295,802 | 10/1981 | Peschke | 141/59 X |
| 4,437,484 | 3/1984 | Laing et al. | 137/565 |
| 5,150,742 | 9/1992 | Motohashi et al. | 141/59 |
| 5,205,316 | 4/1993 | Pruett | 137/209 |
| 5,415,196 | 5/1995 | Bryant . | |
| 5,575,629 | 11/1996 | Olson et al. | 141/59 X |

FOREIGN PATENT DOCUMENTS 0 417 004  3/1991  European Pat. Off. .

*Primary Examiner*—John Rivell
*Attorney, Agent, or Firm*—Connolly & Hutz

[57] ABSTRACT

The process and device according to the invention make it possible to reduce the pressure build-up in the head space as a function of the quantity of inflow medium. It also makes it possible to maintain or create defined flow conditions in the head space gas. This is accomplished by measuring the quantity of gaseous and/or liquid inflow medium and then venting the head space gas as a function of the quantity of inflow medium.

13 Claims, 1 Drawing Sheet

5,896,881

PROCESS AND DEVICE TO REGULATE THE INNER PRESSURE OF A TANK AND/OR TO ESTABLISH DEFINED FLOW CONDITIONS FOR GAS CURRENTS IN THE HEAD SPACE OF TANKS

BACKGROUND OF INVENTION

The present invention relates to a process to regulate the inner pressure of tanks and/or to establish defined flow conditions for gas currents in the head space of tanks.

When tanks are filled with gases or liquids, due to design or process-technological considerations, it is often necessary to ensure that the gas present in the head space of these tanks be specifically vented so that the inner pressure in the tank does not rise. This is the case, when gas is added to the tanks for example, for purposes of inertization, or when they are filled. The requirement to specifically vent gas from the head space is particularly crucial when the head space gas cannot be released directly into the atmosphere, but rather, has to be conveyed through pipelines or exhaust-gas cleaning systems which cause a loss of pressure. In order to overcome the pressure loss along the outlet line for the head space gas, it is then necessary to have an exhaust fan or pump. According to the state of the art, these aggregates are controlled by means of pressure measurement in the head space of the tank and, as a rule, this calls for quite complex measurement and control, since it is necessary to record even minute pressure increases. If commonly employed pressure gages are used to measure the pressure, the regulation of the pressure entails such a delay that—particularly when the outlet for the head space gas is separated from the head space by long lines—pressure increases occur which must be prevented. The use of more sensitive pressure-measuring devices involves high acquisition costs.

SUMMARY OF INVENTION

Therefore, the invention is based on the objective of creating a process and a device with which it is possible to increase the sensitivity of the pressure regulation in a cost-efficient manner while reducing the delay with which pressure relief takes place.

In accordance with the invention, the quantity of gaseous and/or liquid inflow medium is measured and the head space gas is vented as a function of the quantity of inflow medium.

With the process and device according to the invention, it is now possible to enhance the safety of tanks without extensive use of measurement and control technology.

THE DRAWINGS

The drawings depict two devices in schematic form for exemplary applications of the process according to the invention.

FIG. 1 shows a device for the pressure regulation of a tank with a long outlet line for the head space gas, for those cases in which the inflow medium is a liquid; and FIG. 2 shows a device in which the inflow medium is gaseous.

DETAILED DESCRIPTION

Figure 1:
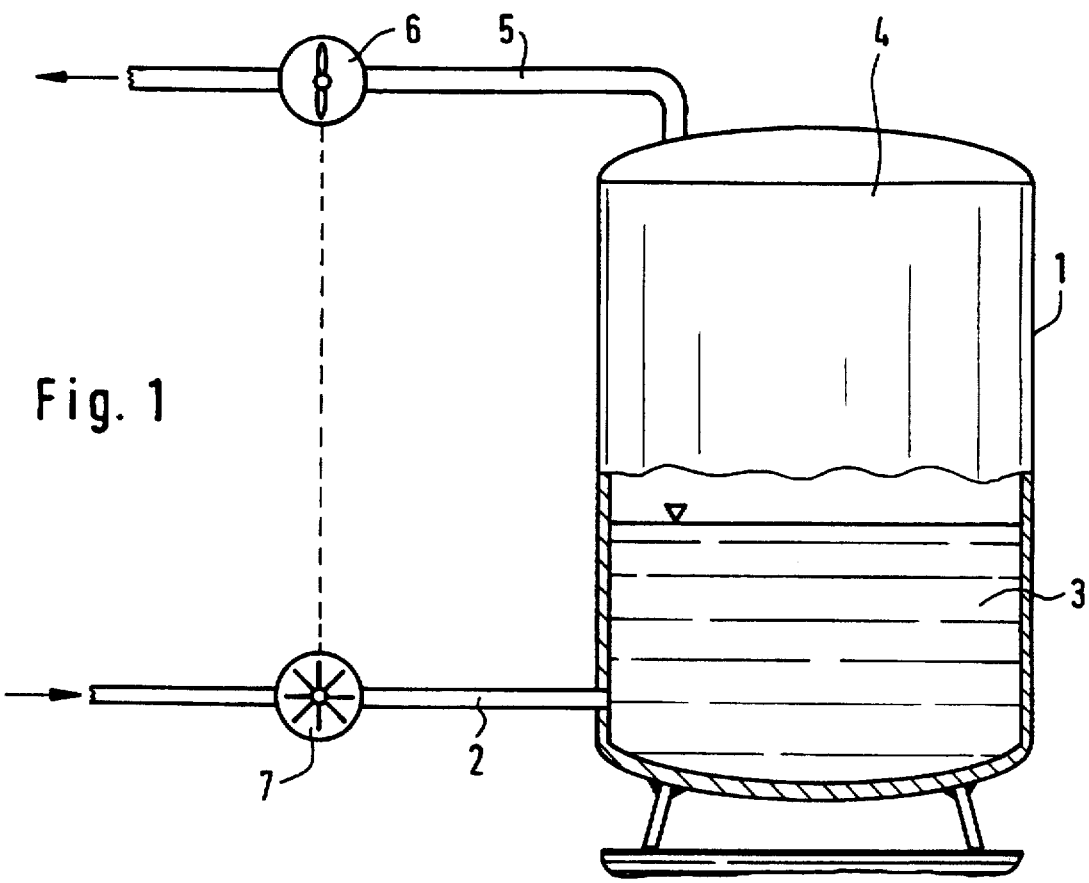

FIG. 1 shows a tank 1 which is filled with an inflow medium in the form of a liquid 3 via an inlet line 2 whereby, in its head space 4, the tank has an outlet line 5 that is provided with a fan 6 for head space gas. Integrated in the inlet line 2, there is a turbine 7 which drives the fan 6. The broken line without a reference number represents a coupling which controls or drives the fan 6 by means of the driving force generated by the turbine 7.

Figure 2:
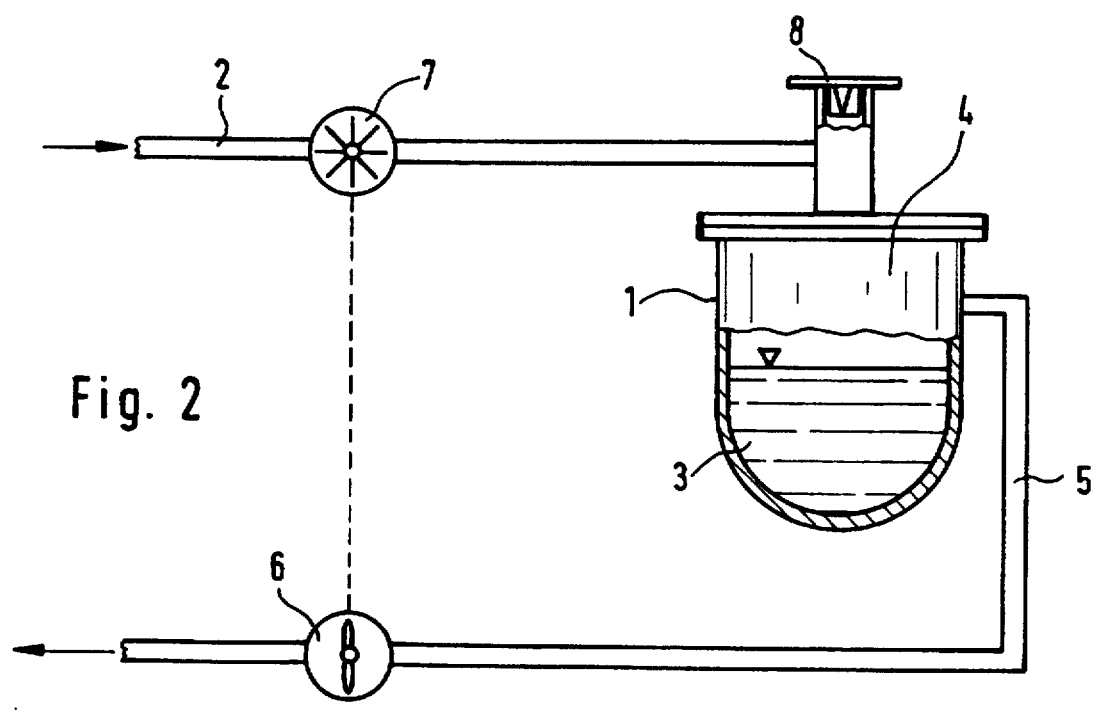

In FIG. 2, the same device features have been designated with the same reference numbers. In this figure, the tank 1 is equipped with an inert-gas lock 8 which is filled with an inflow medium in the form of an inert gas via the inlet line 2.

When the tank 1 depicted in FIG. 1 is being filled, the liquid inflow medium such as, for instance, gasoline, solvent or water, enters the tank 1 via the inlet line 2, whereby the turbine 7 is driven as a function of the flow volume. Instead of turbine 7, it is also possible to have a rotating piston machine or any other device that is suitable to determine the flow rate. By virtue of its intrinsic volume, the quantity of liquid entering the tank 1 brings about a reduction of the head space volume which leads to a pressure increase in the head space of the tank 1. In order to be able to effectuate a pressure release synchronously to the pressure rise caused by this inflow, use is made of the driving force generated by the turbine 7 as a result of the flow of liquid for purposes of setting the fan 6 in operation, which then vents the head space gas that becomes compressed to the same extent that the liquid flows in. The driving force is transmitted to the fan 6—which can also be replaced by a suction pump or other devices—via a shaft represented by the broken line without a reference number. Instead of the shaft, it is also possible to use a gear or any other electronic, electric, pneumatic or hydraulic coupling. The venting according to the invention of the tank head space, on the one hand, ensures that the pressure in the tank remains constant while, on the other hand, the fan 6 generates the pressure needed to compensate for the pressure loss of the pipeline systems located downstream. The regulation is particularly advantageous if, downstream from the tank 1, there are waste-gas purification units or other device components which prevent or hinder automatic escaping of the head space gas. At the same time, it is possible to assure the operating pressure needed to run the waste-gas purification units. In the case of the example shown in FIG. 2, the inlet line 2, which is provided with a turbine 7, is used to feed in a gaseous inflow medium in the form of an inert gas. In this process, the inert gas covers the liquid surface of the liquid 3 to be protected against oxygen entry and exits the tank 1 via the outlet line 5 which is provided with a fan 6. Once the inert-gas lock 8 is opened, on the one hand, inert gas has to be fed in via the inlet gas line 2 in order to prevent any inert gas losses and the hazards associated with this while, on the other hand, turbulence has to be avoided which could lead to a mixing of oxygen in the head space room of tank 1. This means that it is necessary to maintain controlled flow conditions in the head space of tank 1. According to the invention, this is done in that the turbine 7, which is powered by the flowing inert gas, drives the fan 6 by means of a mechanical coupling, in the form of a gear. This ensures that currents being created in the head space acquire a certain orientation. With the defined flow created in this manner, a certain amount of the gas fed in can be simultaneously vented out of the tank at the same time as the inflow. Naturally, the entire gas current can also be fed in an oriented flow. In closed tanks, it is also possible to maintain a defined excess or negative pressure in that the fan is controlled by increasing or decreasing the driving energy. Instead of turbine 7, it is possible to employ a rotating piston machine, analogously to the device in FIG. 1. Likewise, pumps can be employed instead of the fan 6 as the means of conveyance and, instead of the mechanical coupling in the form of a gear, it is possible to use the means listed in the example of FIG. 1. With the process and device according to the invention, the pressure in a tank can be kept constant in a simple way, or else flow conditions in the head space of the tank can be maintained or controlled in a defined manner. This ensures that the head space gas will always be vented precisely when a tank is filled with an inflow medium. In particular, this approach eliminates the delay with which regulation according to the state of the art has to be carried out.

What is claimed is:

1. In a process to regulate the inner pressure of a tank and/or to establish defined flow conditions for gas currents in the head space of tanks, in which there is the inflow of a gaseous inflow medium and a venting of the head space gas, the improvement being in that the quantity of gaseous inflow medium is measured and the head space gas is vented as a function of the quantity of inflow medium.

2. Process according to claim 1, characterized in that said gaseous inflow medium is an inert gas.

3. In a device having at least one tank, at least one inlet gas line communicating with said tank for the gaseous inflow medium, and at least one outlet line for the head space gas in said tank, the improvement being in means for feeding gaseous inflow medium into said tank, means to determine the amount of gaseous inflow medium that is being fed into said tank, means for metered discharge of the head space gas in said tank, and means to control said means for the metered discharge of head space gas, which are actuated by said means to determine the amount of gaseous inflow medium that is being fed in.

4. Device according to claim 3, characterized in that said means to determine the amount of inflow medium that is being fed in is a turbine.

5. Device according to claim 4, characterized in that said means to discharge head space gas is a fan.

6. Device according to claim 5, characterized in that said means to control the means for the discharge of head space gas is a gear.

7. Device according to claim 6, characterized in that a component is installed downstream from said tank which cause a loss of pressure.

8. Device according to claim 7, characterized in that said component which causes a loss of pressure is a long outlet line.

9. Device according to claim 3, characterized in that said means to discharge head space gas is a fan.

10. Device according to claim 3, characterized in that said means to control the means for the discharge of head space gas is a gear.

11. Device according to claim 3, characterized in that a component is installed downstream from said tank which cause a loss of pressure.

12. Device according to claim 11, characterized in that said component which causes a loss of pressure is a long outlet line.

13. Device according to claim 3, characterized in that said gaseous inflow medium is an inert gas.

* * * * *